United States Patent
Lai

(10) Patent No.: US 9,103,997 B2
(45) Date of Patent: Aug. 11, 2015

(54) LOW COST OPTICAL CONNECTOR

(71) Applicant: HON HAI PRECISION INDUSTRY CO., LTD., New Taipei (TW)

(72) Inventor: Chih-Chen Lai, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 159 days.

(21) Appl. No.: 13/929,093

(22) Filed: Jun. 27, 2013

(65) Prior Publication Data

US 2014/0212093 A1 Jul. 31, 2014

(51) Int. Cl.
*G02B 6/42* (2006.01)

(52) U.S. Cl.
CPC .............. *G02B 6/4204* (2013.01); *G02B 6/428* (2013.01); *G02B 6/4214* (2013.01); *G02B 6/4274* (2013.01)

(58) Field of Classification Search
CPC .... G02B 6/4214; G02B 6/428; G02B 6/4274; G02B 6/4204; G02B 6/0083; H01L 27/0688
USPC .......................................................... 257/98
See application file for complete search history.

(56) References Cited

U.S. PATENT DOCUMENTS

| | | | |
|---|---|---|---|
| 4,732,446 A * | 3/1988 | Gipson et al. ................ | 385/24 |
| 6,364,542 B1 * | 4/2002 | Deane et al. ................ | 385/92 |
| 6,984,076 B2 * | 1/2006 | Walker et al. ................ | 385/94 |
| 7,165,896 B2 * | 1/2007 | Hauffe et al. ................ | 385/88 |
| 7,579,629 B2 * | 8/2009 | Inoguchi .................... | 257/98 |
| 7,732,234 B2 * | 6/2010 | Greisen et al. .............. | 438/29 |
| 8,044,412 B2 * | 10/2011 | Murphy et al. .............. | 257/81 |
| 8,390,013 B2 * | 3/2013 | Tseng et al. ................. | 257/98 |
| 2001/0036344 A1 * | 11/2001 | Steinberg et al. ........... | 385/92 |
| 2004/0069933 A1 * | 4/2004 | Steegmuller et al. ........ | 250/216 |
| 2004/0086011 A1 * | 5/2004 | Bhandarkar ................ | 372/43 |
| 2004/0173808 A1 * | 9/2004 | Wu ............................ | 257/99 |
| 2004/0258110 A1 * | 12/2004 | Bhandarkar ................ | 372/36 |
| 2005/0062119 A1 * | 3/2005 | Gallup et al. ............... | 257/414 |
| 2005/0180698 A1 * | 8/2005 | Hauffe et al. ............... | 385/88 |
| 2007/0091608 A1 * | 4/2007 | Hauffe et al. ............... | 362/267 |
| 2008/0128714 A1 * | 6/2008 | Pang et al. .................. | 257/88 |
| 2008/0226228 A1 * | 9/2008 | Tamura et al. ............... | 385/33 |
| 2010/0104290 A1 * | 4/2010 | Nobuhara et al. ............ | 398/82 |
| 2011/0064358 A1 * | 3/2011 | Nishimura .................. | 385/33 |
| 2011/0170831 A1 * | 7/2011 | Tamura ...................... | 385/88 |
| 2011/0186873 A1 * | 8/2011 | Emerson ..................... | 257/88 |
| 2011/0233583 A1 * | 9/2011 | Lin et al. .................... | 257/98 |
| 2014/0183331 A1 * | 7/2014 | Sheu .......................... | 250/206 |
| 2014/0212093 A1 * | 7/2014 | Lai ............................. | 385/33 |

* cited by examiner

*Primary Examiner* — Rhonda Peace
(74) *Attorney, Agent, or Firm* — Novak Druce Connolly Bove + Quigg LLP

(57) ABSTRACT

An optical connector includes a printed circuit board, a substrate, a photoelectric die, a number of wires, a lens element, and an optical fiber. The substrate is mounted on the printed circuit board. The photoelectric die is wire-bonded to the substrate by the wires. The photoelectric die is packaged by the lens element, the substrate and the printed circuit board and optically coupled to the optical fiber by the lens element.

6 Claims, 2 Drawing Sheets

LOW COST OPTICAL CONNECTOR

BACKGROUND

1. Technical Field

The present disclosure relates to optical connectors and, more particularly, to a low cost optical connector.

2. Description of Related Art

Optical connectors include a printed circuit board and a number of photoelectric dies positioned on and electrically connected to the printed circuit board by die bond and chip on board technologies, which typically require high-cost equipment, thus increasing cost of the optical connectors.

Therefore, it is desirable to provide an optical connector, which can overcome the above-mentioned problems.

BRIEF DESCRIPTION OF THE DRAWINGS

Many aspects of the present disclosure can be better understood with reference to the following drawings. The components in the drawings are not necessarily drawn to scale, the emphasis instead being placed upon clearly illustrating the principles of the present disclosure.

DETAILED DESCRIPTION

Embodiments of the present disclosure will be described with reference to the drawings.

Figure 1:
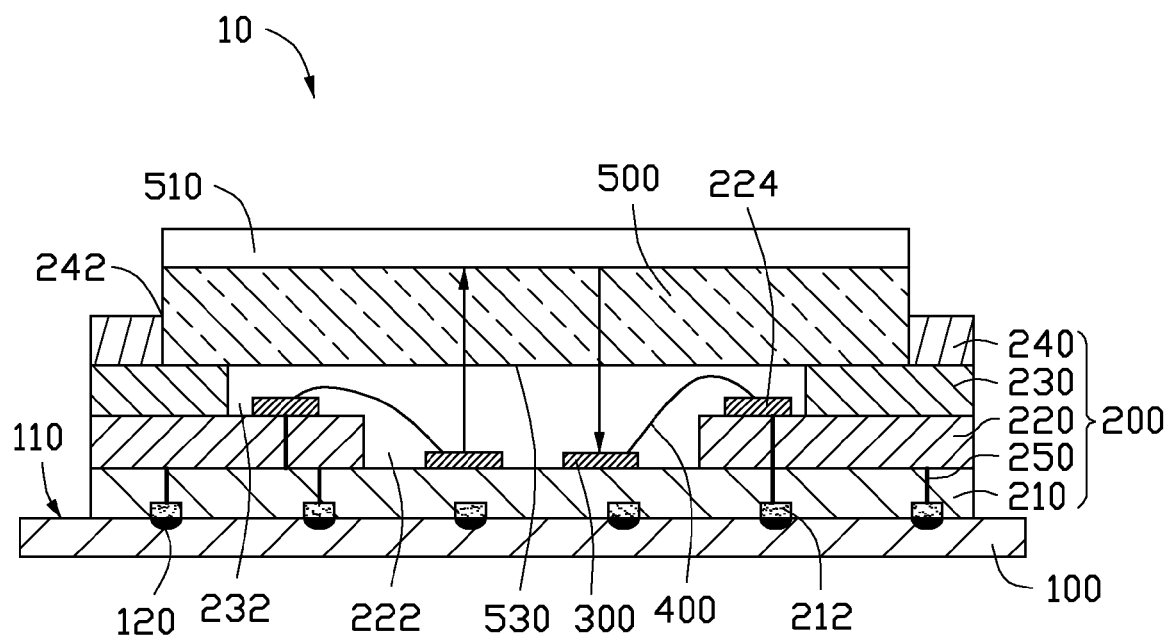
FIG. 1 is a cross-sectional view of an optical connector, according to an embodiment.
Figure 2:
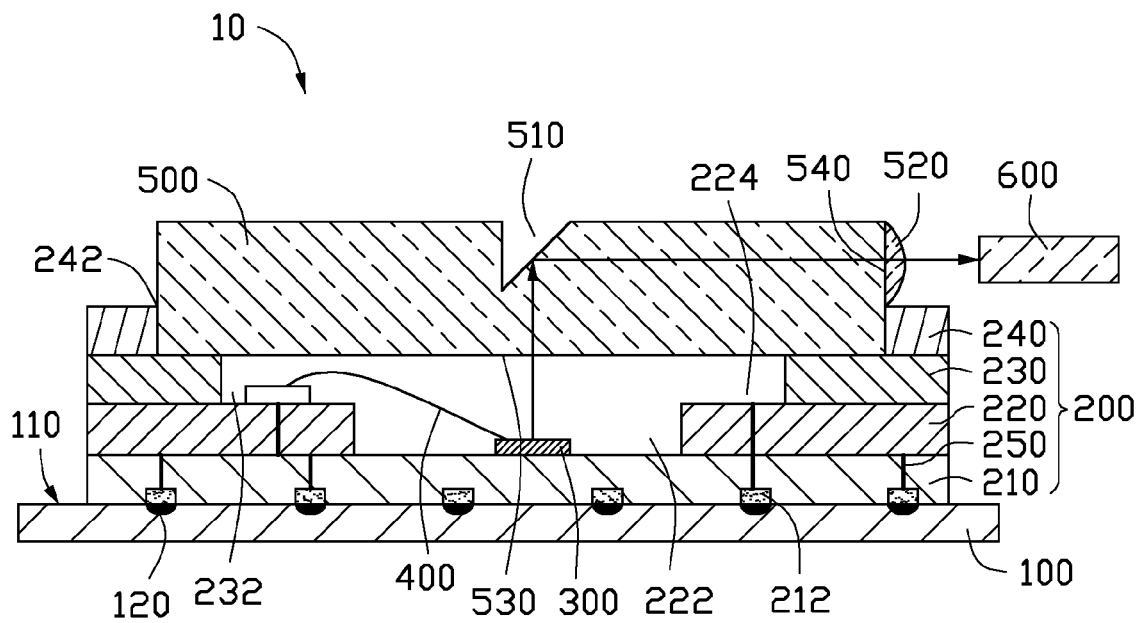
FIG. 2 is another cross-sectional view of the optical connector, viewed from another angle.

FIGS. 1 and 2 show an optical connector 10 in accordance with an embodiment. The optical connector 10 includes a printed circuit board 100, a substrate 200, a number of photoelectric dies 300, a number of wires 400, a lens element 500, and a number of optical fibers 600.

The printed circuit board 100 includes a first surface 110, such as a top surface, and a number of first soldering pads 120 formed on the first surface 110. The printed circuit board 100 also forms circuits to enable various intended functions, for example, to connect the first soldering pads 120 to external circuits (not shown).

The substrate 200 includes, in this order from one lateral side to anther, a first layer 210, a second layer 220, a third layer 230, and a fourth layer 240.

The second layer 220 defines a first through hole 222, the third layer 230 defines a second through hole 232, and the fourth layer 240 defines a third through hole 242. The first through hole 222, the second through hole 232, and the third through hole 242 are concentric and communicate with each other. The second through hole 232 is larger than the first through hole 222 but is smaller than the third hole 242.

The first layer 210 includes a number of second soldering pads 212 formed in a side opposite to the second layer 220. The second soldering pads 212 correspond to the first soldering pads in number, shape, size, and position.

The second layer 220 includes a number of bonding pads 224 on a side opposite to the first layer 210. The bonding pads 224 are received in the second through hole 232.

The substrate 200 also includes a number of vias 250 extending through the first layer 210 and the second layer 220 to connect the bonding pads 224 to the second soldering pads 212 in a desired manner.

The photoelectric dies 300 can be light emitting dies, such as laser diode dies and light emitting diode dies, or light receiver dies, such as photo diode dies.

The wires 400 can be copper, silver, or gold wires.

The lens element 500 is made of transparent plastic by, for example, injection molding technology, and is substantially rectangular, and corresponds to the third through hole 242 in shape and size.

The lens element 500 includes an incident surface 530, an emitting surface 540 perpendicularly connected to the incident surface 530, a number of lenses 520 formed on the emitting surface 540, and a guiding structure 510 to optically direct light entering the incident surface 530 to the lenses 540 or light entering the lenses 540 to the incident surface 530. In this embodiment, the guiding structure 510 is a triangular slit.

The optical fibers 600 correspond to the photoelectric dies 300.

In assembly, the photoelectric dies 300 are positioned on the first layer 210 and received within the first through hole 222. Then, the photoelectric dies 300 are connected to the bonding pads 224 through the wires 400 using wire bond technology, which is a more mature technology, as compared with die bond and chip on board technologies, and typically requires less costly equipment. Next, the lens element 500 is positioned on the third layer 230 and sealed in the third through hole 242 such that the incident surface 530 faces the photoelectric dies 300. The substrate 200 with the photoelectric dies 300 is packaged in the lens element 500 and mounted to the printed circuit board 100 by, for example, surface mount technology, which is a more mature technology, as compared with die bond and chip on board technologies, and is less costly. The first layer 210 contacts the printed circuit board 100 and each second soldering pad 212 is connected with one of the first soldering pads 120. The optical fibers 600 are aligned with the lenses 520 and thus optically coupled with the photoelectric dies 300 via the lens element 500.

As such, cost of the optical connector 10 is reduced.

In other embodiments, only one photoelectric element 300 and one optical fiber 600 can be employed.

It will be understood that the above particular embodiments are shown and described by way of illustration only. The principles and the features of the present disclosure may be employed in various and numerous embodiments thereof without departing from the scope of the disclosure. The above-described embodiments illustrate the possible scope of the disclosure but do not restrict the scope of the disclosure.

What is claimed is:

1. An optical connector, comprising:
   a printed circuit board;
   a substrate mounted on the printed circuit board and comprising:
     a first layer positioned on the printed circuit board;
     a second layer positioned on the first layer and defining a first through hole, the second layer comprising a plurality of bonding pads on a side opposite to the first layer;
     a third layer positioned on the second layer and defining a second through hole, the second through hole being concentric with and larger than the first through hole, the second layer comprising a plurality of bonding pads on a side opposite to the first layer and received in the second through hole;
     a fourth layer positioned on the third layer and defining a third through hole being concentric with and lager than the first through hole; and
     a plurality of vias connecting the bonding pads to the printed circuit board;
   a photoelectric die positioned on the first layer and received in the first through hole;

a plurality of wire bonding to the photoelectric die and the bonding pads;
an optical fiber; and
a lens element positioned on the third layer and sealing the third through hole and optically coupling the optical fiber to the photoelectric die.

2. The optical connector of claim 1, wherein the printed circuit board comprises a first surface and a plurality of first soldering pads on the first surface, the first layer is positioned on the first surface and comprises a plurality of second soldering pads soldered to the first soldering pads, and the vias connect the bonding pads to the second soldering pads.

3. The optical connector of claim 1, wherein the photoelectric die is a light emitting die selected from the group consisting of a light emitting diode die and a laser diode die.

4. The optical connector of claim 1, wherein the photoelectric die is a photo diode die.

5. The optical connector of claim 1, wherein the lens element comprises an incident surface facing the photoelectric die, an emitting surface perpendicularly connected to the incident surface, a lens on the emitting surface, and a guiding structure to optically direct light entering the incident surface to the lens or light entering the lens to the incident surface.

6. The optical connector of claim 5, wherein the guiding structure is a triangular slit defined in the lens element.

\* \* \* \* \*